United States Patent [19]

Aceti

[11] 4,424,630

[45] Jan. 10, 1984

[54] APPARATUS FOR MEASURING THE DIMENSIONS OF DELICATE PARTS

[75] Inventor: John G. Aceti, Princeton, N.J.

[73] Assignee: RCA Corporation, New York, N.Y.

[21] Appl. No.: 335,512

[22] Filed: Dec. 29, 1981

[51] Int. Cl.³ .............................................. G01B 7/28
[52] U.S. Cl. ................................ 33/174 L; 33/172 E; 33/174 P
[58] Field of Search ............ 33/172 R, 172 B, 172 E, 33/169 R, 143, 147, 148, 174 P, 174 L

[56] References Cited

U.S. PATENT DOCUMENTS

| | | | |
|---|---|---|---|
| 2,437,639 | 3/1948 | Floyd | 33/147 N |
| 3,107,432 | 10/1963 | Dickison et al. | 33/143 L |
| 3,320,672 | 5/1967 | Engle | 33/148 H X |
| 3,842,194 | 10/1974 | Clemens | |
| 3,975,829 | 8/1976 | Possati | 33/172 E X |
| 3,996,669 | 12/1976 | Anichini | 33/172 E |
| 4,221,053 | 9/1980 | Bobel et al. | 33/172 E X |
| 4,239,108 | 12/1980 | Coleman | |

FOREIGN PATENT DOCUMENTS 941751 4/1956 Fed. Rep. of Germany .... 33/172 E

*Primary Examiner*—Harry N. Haroian
*Attorney, Agent, or Firm*—E. M. Whitacre; J. S. Tripoli; J. E. Roehling

[57] ABSTRACT

A measuring gauge, suitable for measuring the plastic record caddy for a video disc, uses a transducer and a driver assembly. The transducer includes a plunger which will trigger a detector if a force of less than one gram is applied thereto. The transducer is coupled to the driver assembly. The driver assembly includes a stepping motor for moving the transducer and a target and sensor for providing an indication of a reference position.

13 Claims, 5 Drawing Figures

APPARATUS FOR MEASURING THE DIMENSIONS OF DELICATE PARTS

The present invention relates to apparatus for measuring certain dimensional parameters of a yieldable part. More particularly, it relates to apparatus for measuring certain dimensional parameters of a protective caddy suitable for use with video disc players.

In certain video disc systems, information is stored on a disc record in the form of geometric variations in the bottom of a continuous spiral groove disposed on the record surface. A capacitive-type video disc system is illustratively disclosed in U.S. Pat. No. 3,842,194 (Clemens). In such systems, it is beneficial to enclose the video disc record in a thin plastic caddy in order to protect it. The caddy comprises a protective jacket and a record retaining spine removably located therein. In operation, when a record is to be played, the caddy, enclosing the record, is inserted in a player. The player is equipped with means for extracting the record disc from the caddy such that when the jacket is removed the record disc remains in the player. For subsequent record retrieval, the jacket is inserted into the player, when the caddy is withdrawn from the player, the record disc is retrieved. Reference is made to U.S. Pat. No. 4,329,108, issued to C. F. Coleman, for a prior art example of a video disc caddy and a record extracting mechanism for use therewith.

The physical dimensions of the protective caddy in a Coleman-type system must be carefully controlled to insure proper operation of the system. If the internal clearance, thickness, flatness or twist of the caddy are not within certain prescribed limits, the caddy may not fit into the player or the information surface on the disc record may be damaged when the record disc is removed or reinserted. To reduce the incidence of jammed players and damaged records, the dimensions of the caddy should be accurately measured during the manufacturing process. It has been found that the internal clearance, flatness, etc. of the caddy in a Coleman-type system should be measured to within 25 micrometers.

The plastic caddy is a delicate part that deforms when light pressure is applied. For example, a Coleman-type caddy will deform more than 25 micrometers when a one gram force is applied through the center web. Thus, if the measurement is not made properly, the pressure of the measuring tool may deform the part being measured by more than the accuracy that is required in the measurement.

Gauges or measuring instruments for use in measuring the dimensions of delicate parts are available in the prior art. In general, however, it has been found that prior art commercially available gauges for measuring delicate parts are not suitable for measuring video disc caddies. Pneumatic gauges are available which may be used to make measurements within 25 micrometers while applying less than one gram of force; however, such gauges are expensive, slow in movement, and limited in the amount of travel.

Another gauge which is commercially available is the capacitance gauge. In operation, a pair of capacitance probes are positioned on opposite sides of the part to be measured. The capacitance of the probes is measured and the thickness of the part is deduced from the measured capacitance. The problem with this technique is that the material, thickness of the material and other physical properties of the part being measured affects the measurement. Further, capacitance gauges are too slow for an application where millions of parts must be measured each year.

A third type of commercially available gauge is an optical measuring gauge. A light beam is reflected off of a surface of the part being measured. The problem with this type of gauge is that the reflectance of the surface being measured must be consistent from part to part to insure dependable results. In the Coleman system, the reflectivety of the caddy parts are not consistent enough from part to part to use an optical gauge. Additionally, it is necessary sometimes to measure caddies which are provided with an identifying label. Since the surface reflectivity of a caddy having a label is substantially different from that of an unlabeled caddy optical gauges are not suitable. Furthermore, another problem with respect to optical gauges is that they are limited in travel.

In accordance with the principles of the present invention, an electromechanical gauge is provided which may be used for accurately measuring delicate parts at high speed over a broad range of sizes.

In accordance with one aspect of the present invention, an apparatus is provided for measuring a given dimension of a yieldable part. The apparatus comprises a transducer means including a tactile member. The tactile member is movable when it contacts the yieldable part with a given force. Further, the apparatus includes a first means for sensing the movement of the tactile member and for indicating a measurement position of the transducer means. A second means for sensing is provided to sense the position of the transducer when it is in a reference position. A driving means drives the transducer means in a first direction such that the transducer means is moved from the reference position to the measurement position and in a second direction from the measurement position to the reference position.

In accordance with another aspect of the present invention, an apparatus is provided for measuring a given dimension of a yieldable part. The apparatus comprises a tactile member having a nib for contacting a surface. The tactile member is movable when a given force is applied to the nib. A first target member is connected to the tactile member. Further, detecting means is provided for detecting the movement of the first target member when the given force is applied to the nib. A driving means drives the tactile member in a first direction from a reference position to a measuring position and in a second direction from the measuring position to the reference position. A second target member is connected to the driving means. Additionally, the apparatus includes a means for detecting the position of the second target member when the tactile member is in the reference position.

Other features and advantages of the invention will be more fully understood from the following detailed description of the preferred embodiment, the appended claims and the accompanying drawing in which:

Figure 1:
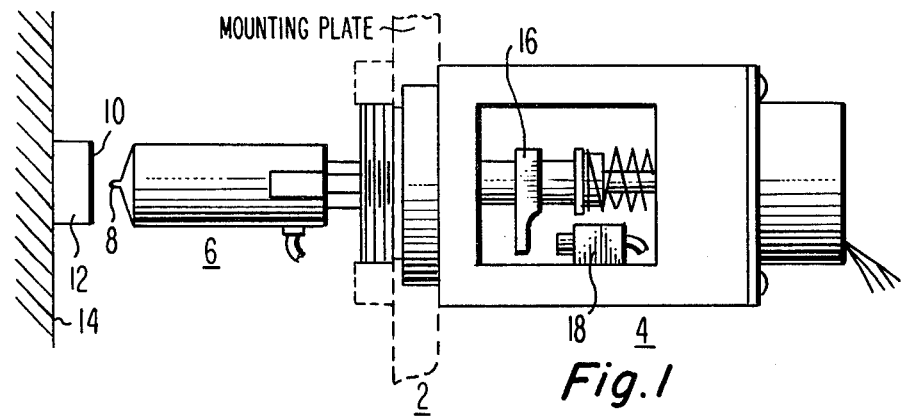
FIG. 1 shows a plan view of a measuring apparatus in accordance with the principles of the present invention.

Referring to FIG. 1, a measuring gauge 2 is shown. Gauge 2 comprises two basic parts, a driver assembly 4 and a low contact force transducer element 6. Driver assembly 4 drives transducer 6 in one direction (e.g., to the left) until tip 8 of transducer 6 just contacts surface 10 of part 12 which is being measured. Part 12 is resting against a reference plane 14. Illustratively, part 12 may be a plastic record disc caddy or part thereof as used in a video disc player system. Tip 8 contacts part 12 with a very light force (illustratively, less than one gram of force). After the tip has contacted part 12 and a measurement has been made (a description of how a measurement is taken will be described herein) transducer 6 is driven in the opposite direction (e.g., to the right) until the transducer is positioned in a reference position (i.e., when the position of target 16 is sensed by detector 18).

Figure 2:
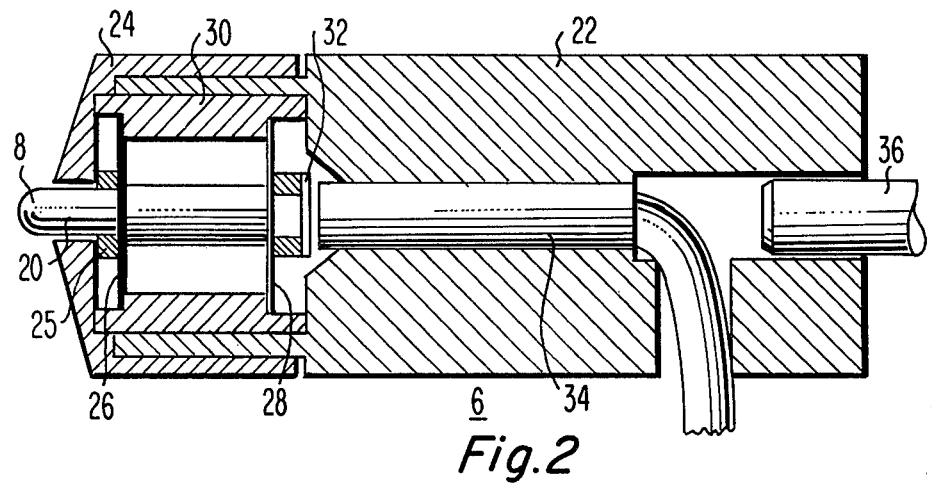
FIG. 2 is a plan view, partially in cross-section, of the transducer portion of the measuring apparatus of FIG. 1.

Referring to FIG. 2, the details of transducer 6 will now be provided. Transducer 6 includes plunger 20 having tip 8. Plunger 20 is enclosed in housing (frame member) 22 and cap 24. A pair of radial springs 26 and 28 which are retained by spring spacer 30 limit the movement of plunger 20 to motion along or parallel to the longitudinal axis of transducer 6. Spacer 25 is positioned between cap 24 and spring 26 such that the spring-plunger system is preloaded. This preloading establishes a stable position for the plunger to bias it in the direction of contact (e.g., to the left). Affixed to plunger 20 on the end opposite tip 8 is target 32 (illustratively, target 32 may be formed of a material such as beryllium copper which will trigger an inductive proximity detector). Detector 34 (illustratively, detector 34 may be an inductive proximity detector of a type provided by Gould Denison Comp., type NJO.8-4.5) is housed within housing 22 and positioned to provide an indication of the position of plunger 20 (illustratively, a displacement of 25 micrometers or less would be sufficient to trigger detector 34). Transducer 6 is connected to driver assembly 4 via shaft 36. Illustratively, detector 34 provides a signal output change, e.g., high level to low level, when plunger 20, i.e., target 32, moves less than 25 micrometers—preferably, a force of less than 1 gram applied to tip 8 is sufficient to effect this signal output change.

Figure 3:
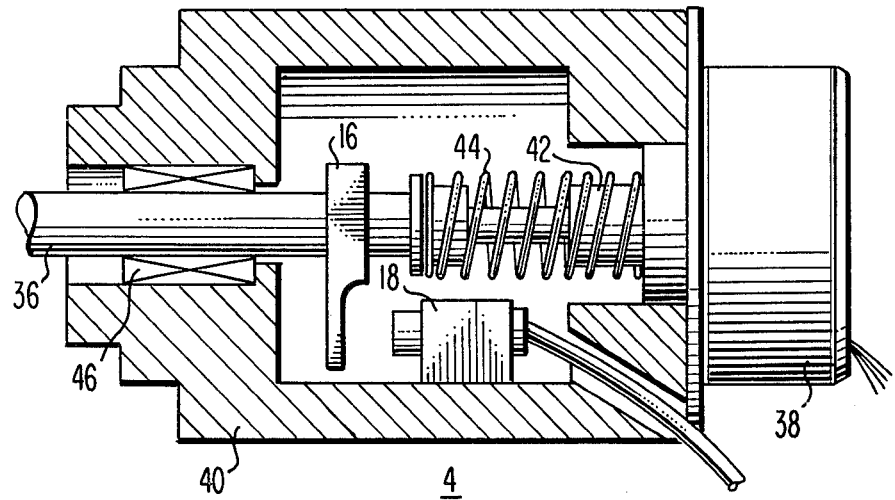
FIG. 3 is a plan view, partially in cross-section, of the driving portion of the measuring apparatus of FIG. 1.

Referring to FIG. 3, the details of driver assembly 4 will now be explained. Driver assembly 4 provides axial motion and a reference position detector for the transducer. Axial motion of shaft 36 is provided by linear stepping motor 38. Preferably linear stepping motor 38 is arranged with other elements to advance shaft 36 in the axial direction or perpendicular to the motor rotation in response to digital signal pulses from a controller. Illustratively, stepping motor 38 may be of a type provided by Airpax, Div. of North American Phillips, type K92211-P2 which will advance shaft 36 in 25 micrometer steps at rates exceeding 250 steps/second. Motor 38 is connected to housing (frame member) 40. Motor shaft 42 is coaxial with and connected to shaft 36. Spring 44 biases the lead screw of motor 38 in one direction to compensate for backlash. Shaft 36 slides in housing 40 along linear bearing 46. To provide an indication of a reference position for the transducer a second target 16 and detector 18 are included in driver assembly 4. Target 16 is rigidly attached to shaft 36. Detector 18, which illustratively may be of the type described with reference to detector 34, is mounted within housing 40 such that a signal indication is provided when target 16 is in its reference position. Illustratively, when target 16 is moved into its reference position i.e., close enough to detector 18 such that its location can be detected, the signal output from detector 18 changes, e.g., signal output goes from a high to a low level.

Figure 4:
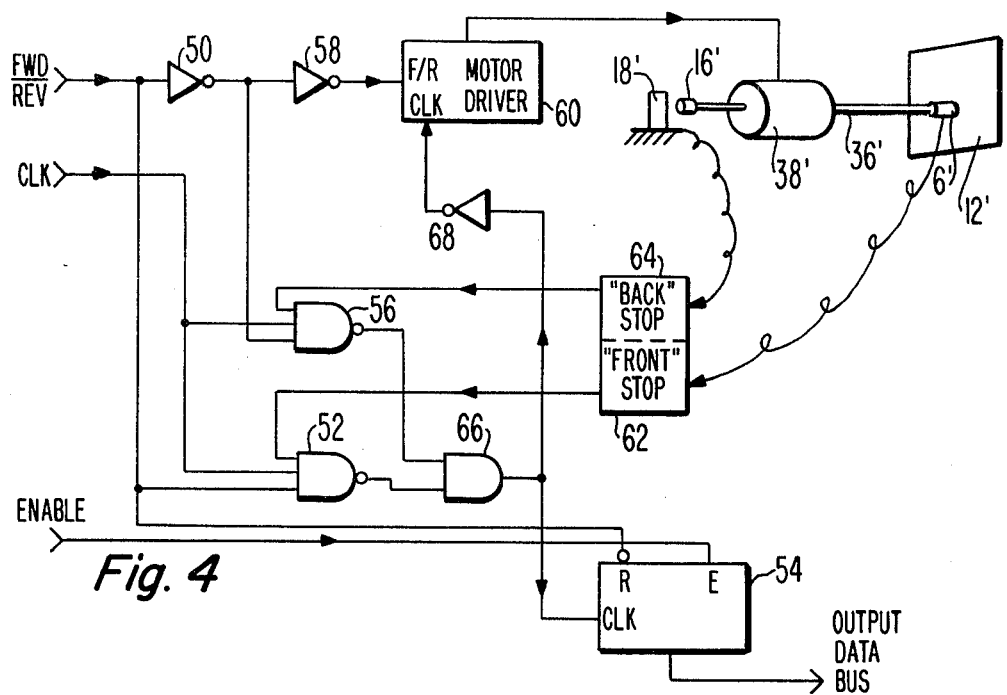
FIG. 4 is a detailed schematic of the control circuitry for the measuring apparatus of FIG. 1.

The operation of measuring gauge 2 will now be explained with reference to FIG. 4. It should be noted that reference to elements identified by primed numerals correspond to elements of like numerals which are unprimed. A FWD/REV pulse (for example, FWD may be a high signal input while REV may be a low signal input) is delivered simultaneously to inverter 50, NAND gate 52 and the reset input to counter 54. Clock pulses are delivered simultaneously to NAND gates 52 and 56 from a suitable source (not shown). An enable pulse is delivered to the enable input of counter 54 to read out the counter. The FWD/REV pulse is delivered from the output of inverter 50 simultaneously to inverter 58 and one input of NAND gate 56. The output signal from inverter 58 is delivered to the F/R input of motor driver 60 (illustratively, the motor driver may be of a type provided by Airpax, Div. of North American Phillips, type SAA1027 IC Driver). The motor driver delivers pulses to stepping motor 38' which drives shaft 36' in a first direction such that transducer 6' approaches the part 12', which is to be measured, and in a second direction opposite the first such that the target 16' approaches sensor 18'. Normally, "FRONT" stop 62 provides a high output (i.e., when transducer 6' is not in a measurement position). On the other hand, when transducer 6' is in a measuring position the output from stop 62 is in a low state. "BACK" stop 64 provides a high output when target 16' is not in a reference position and a low output when it is in a reference position. The output signal from "FRONT" stop 62 is supplied to one input of NAND gate 52 and that from "BACK" stop 64 is supplied to one input of NAND gate 56. The output signals from NAND gates 52 and 56 are delivered to respective inputs of AND gate 66. The output signal from AND gate 66 is delivered simultaneously to the clock input of motor driver 60 via inverter 68 and to the clock input of counter 54.

In operation, a high signal indicative of a FWD (forward) pulse is provided to the FWD/REV input. Prior to delivery of the FWD pulse the gauge is positioned in a reference position. The high signal from FWD/REV is delivered via inverters 50 and 58 to the forward/reverse input of motor driver 60. When the F/R input to motor driver 60 is in a high state the clock pulses received by motor driver 60 are delivered to motor 38' such that transducer 6' approaches part 12'. With a high FWD/REV input and a high input from the "FRONT" stop coupled to NAND gate 52, incoming clock pulses are clocked through gate 52 to AND gate 66. Since the input to AND gate 66 from NAND gate 56 is normally high, the clock pulses from NAND gate 52 are clocked through AND gate 66 to the clock input of counter 54 and via inverter 68 to the clock input of motor driver 60. The high signal from the FWD/REV input enables counter 54 such that it is ready to count clock pulses delivered to motor 38'. Motor 38' advances at known increments, for example, in 25 micrometers steps for each clock pulse delivered thereto. Thus, in operation, counter 54 counts the clock pulses delivered to motor driver 60 and provides an indication of the amount motor 38' moves to make a measurement.

Motor 38' rotates to move transducer 6' until light contact is made with part 12'. When the transducer 6' contacts part 12' the output from "FRONT" stop 62 goes from a high to a low state, disabling gate 52 such that the clock pulses are no longer clocked through NAND gate 52 to counter 54 and motor driver 60. At this time an enable pulse is delivered to counter 54 to read out the the "gauge count" onto the data bus by pulsing the output enable. Knowing the distance between the reference position where target 16' is in close proximity to detector 18' and the reference plane behind part 12' and the distance traversed to measure part 12' the thickness of part 12' may be deduced.

After a measurement has been made the gauge is returned to the reference position such that a new part may be measured. The FWR/REV input is changed from a high to a low state, thus enabling gate 56 to pass clock pulses from the clock input to AND gate 66. Clock pulses delivered to gate 56 are gated by gate 66. The pulses from gate 66 are delivered via inverter 68 to motor driver 60 and eventually motor 38'. Since the FWD/REV input is in a low state the F/R input to motor driver 60 is in a low state and thus motor 38' is driven in a direction such that target 16' approaches sensor 18'. When target 16' triggers detector 18' "BACK" stop 64 goes from a high to a low state such that gate 56 no longer passes pulses through to gate 66, thus motor 38' stops. At this time the transducer is in a reference position ready to make a new measurement.

Figure 5:
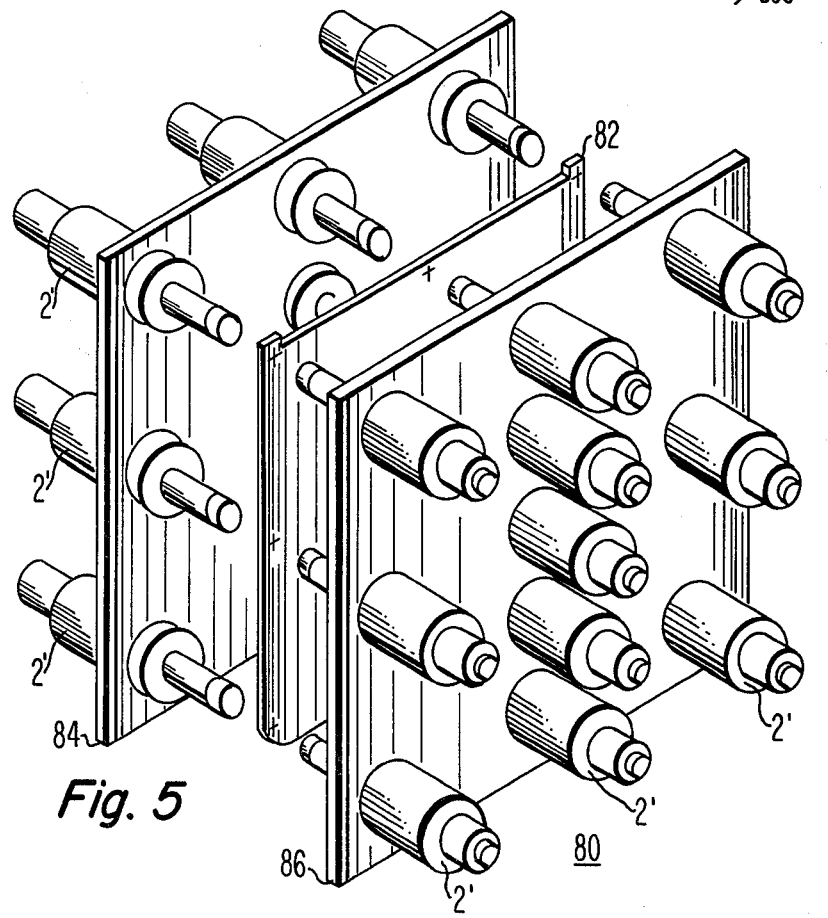
FIG. 5 is a perspective view of an apparatus for use in measuring a video disc caddy.

Referring to FIG. 5, an apparatus 80 for use in measuring a video disc caddy jacket is shown. The thickness, internal clearance, flatness and twist of jacket 82 may be measured by apparatus 80. Jacket 82 is positioned in a measurement position between mounting plates 84 and 86. Mounting plates 84 and 85 are provided with twenty-two measuring gauges 2'. Illustratively, eleven measuring gauges are mounted on mounting plate 84 and another eleven gauges are mounted on mounting plate 86 such that the longitudinal axis of each gauge mounted on mounting plate 84 is aligned with the longitudinal axis of one of the gauges mounted on mounting plate 86.

The thickness, internal clearance, flatness and twist may be measured as follows. The thickness of the caddy jacket is checked at eleven points. The thickness is measured by each pair of opposing gauges. The internal clearance of the jacket, which is also measured at eleven points, is determined by subtracting two caddy jacket wall thicknesses from the corresponding thickness measurement. Three gauge points along a line are used to measure the flatness of the jacket. The position in space of these three points are compared to a straight line to determine the flatness of the jacket. The twist of the jacket is determined from a measure of the position in space of four points measured at the corners of the caddy. Three of the four points are used to establish a plane. The twist is a measure of the perpendicular distance from the fourth point to that established plane.

In operation, a dummy caddy which is formed to the thickness, flatness and twist of a perfect caddy is mounted in the measurement position to calibrate the apparatus. After the dummy caddy is positioned the gauges are driven into a measurement position. The number of steps necessary to move the gauges into the measurement position for measuring the dummy caddy is provided as a reference. During caddy jacket measurement, the gauges are driven into a measurement position to measure plastic caddy jackets. Differences between the actual measurement of plastic jackets and the calibration measurements are used to deduce the thickness, internal clearance, flatness and twist of the plastic part.

It should be clear from the foregoing that measuring gauges in accordance with the present invention are useful for measuring parts other than plastic video disc caddies.

What is claimed is:

1. Apparatus for measuring a given dimension of a yieldable part comprising:
   transducer means including a tactile member, said transducer means being movable between a reference position and a measurement position, said tactile member being movable when said tactile member contacts said yieldable part with a given force;
   first means for sensing the movement of said tactile member when said tactile member contacts said yieldable part and for providing an indication when said transducer means is in said measurement position;
   second means for sensing the position of said transducer means when said transducer means is in said reference position;
   means for driving said transducer means in a first direction such that said transducer is moved from said reference position to said measurement position and for driving said transducer means in a second direction from said measurement position to said reference position, said means for driving being responsive to a pulsed signal such that said transducer is moved a given linear amount for each pulse of said pulsed signal;
   means for providing said pulses signal to said means for driving; and
   means for counting the number of pulses of said pulsed signal provided to said means for driving to move said transducer from said reference position to said measurement position, said given dimension of said yieldable part being determined from said number of pulses.

2. The apparatus according to claim 1 wherein said given force is less than one gram.

3. The apparatus according to claim 2 wherein said movement of said tactile member is less than 25 micrometers.

4. The apparatus according to claim 3 wherein and said transducer means moves in said first and second directions along a given axis, said tactile member being restricted to move in a direction parallel to said given axis.

5. The apparatus according to claim 4 wherein said tactile member is supported in said transducer by a pair of radial springs.

6. Apparatus for measuring a given dimension of a yieldable part comprising:
   a tactile member having a nib for contacting a surface of said yieldable part; said tactile member being movable along a given axis when a given force is applied to said nib;
   a first target member connected to said tactile member;
   means for detecting the movement of said first target member when said given force is applied to said tactile member;

means for driving said tactile member in a first direction from a reference position to a measuring position and in a second direction from said measuring position to said reference position;

a second target member connected to said driving means;

means for detecting the position of said second target member when said tactile member is in said reference position;

means for providing a pulsed signal comprising a succession of pulses to said means for driving, said means for driving being responsive to said pulsed signal such that said transducer is moved a given linear amount for each successive pulse of said pulsed signal delivered thereto; and means for counting the number of successive pulses of said pulsed signal provided to said means for driving when said tactile member is moved from said reference position to said measuring position, said given dimension of said yieldable part being determined from said number of successive pulses.

7. The apparatus according to claim 6 wherein said given force is less than one gram.

8. The apparatus according to claim 7 wherein said tactile member is moved less than 25 micrometers.

9. The apparatus according to claim 8 wherein said tactile member is supported by a pair of radial springs such that the movement of said tactile member is restricted to movement along said given axis when said given force is applied.

10. Apparatus for measuring a given dimension of a yieldable part comprising:

a. transducer means for providing a signal indicating when said transducer contacts said yieldable part with a given force, said transducer means including:

a first frame member;

a tactile member slidably housed in said first frame member;

a first target member coupled to said tactile member; and means for detecting movement of said first target member when said given force is applied to said tactile member;

b. means for driving said transducer means in a first direction to a measurement position and in a second direction to position said transducer means in a reference position including:

a second frame member;

a motor, affixed to said second frame member, for providing linear motion to said transducer means such that said transducer means is driven in said first and second directions;

a shaft coupling said motor to said transducer;

a second target member affixed to said shaft;

means for detecting the location of said second target member when said transducer means is in said reference position;

c. means for providing a pulsed signal comprising a succession of pulses to said motor, said motor being responsive to said pulsed signal such that said transducer is moved a given linear amount for each successive pulse of said pulsed signal delivered thereto; and d. means for counting the number of successive pulses of said pulsed signal provided to said motor when said transducer is moved in said first direction, said given dimension being represented by the number of successive pulses delivered to said motor to move said transducer from said reference position to said measurement position.

11. The apparatus according to claim 10 wherein said given force is less than one gram.

12. The apparatus according to claim 11 wherein said tactile member is slidably housed in said first frame member by supporting said tactile member within said first frame member by a pair of radial springs.

13. The apparatus according to claim 12 wherein said pair of radial springs restrict the movement of said tactile member in a direction axial to said first

* * * * *

UNITED STATES PATENT AND TRADEMARK OFFICE
CERTIFICATE OF CORRECTION

PATENT NO. : 4,424,630

DATED : January 10, 1984

INVENTOR(S) : John Gregory Aceti

It is certified that error appears in the above-identified patent and that said Letters Patent is hereby corrected as shown below:

Col. 6, line 37

"pulses" should be -- pulsed --

Signed and Sealed this

Third Day of July 1984

[SEAL]

Attest:

GERALD J. MOSSINGHOFF

Attesting Officer     Commissioner of Patents and Trademarks